United States Patent
Ekholm et al.

(10) Patent No.: US 8,285,785 B2
(45) Date of Patent: Oct. 9, 2012

(54) METHOD, APPARATUS AND COMPUTER PROGRAM PRODUCT PROVIDING GRAPHICAL USER INTERFACE THAT FACILITATES MANAGEMENT OF MULTIPLE SIMULTANEOUS COMMUNICATION SESSIONS

(75) Inventors: Anne Ekholm, Tampere (FI); Katja H. Leinonen, Tampere (FI); Kimmo T. Tuomainen, Pirkkala (FI); Satu Kalliokulju, Vesilahti (FI); Jarmo Kuusinen, Jyväskylä (FI); Tiiu Koort, Ylöjärvi (FI)

(73) Assignee: Nokia Corporation, Espoo (FI)

( * ) Notice: Subject to any disclaimer, the term of this patent is extended or adjusted under 35 U.S.C. 154(b) by 364 days.

(21) Appl. No.: 11/274,869

(22) Filed: Nov. 14, 2005

(65) Prior Publication Data
US 2006/0148512 A1    Jul. 6, 2006

Related U.S. Application Data

(60) Provisional application No. 60/629,875, filed on Nov. 19, 2004.

(51) Int. Cl.
*G06F 15/16* (2006.01)

(52) U.S. Cl. ......... 709/204; 455/566; 709/205; 709/206

(58) Field of Classification Search ................ 709/204, 709/205, 206
See application file for complete search history.

(56) References Cited

U.S. PATENT DOCUMENTS

| | | | |
|---|---|---|---|
| 6,608,637 B1 | 8/2003 | Beaton et al. | 345/762 |
| 6,753,884 B1 | 6/2004 | Finch, II et al. | 345/762 |
| 7,120,672 B1 * | 10/2006 | Szeto et al. | 709/206 |
| 7,203,755 B2 * | 4/2007 | Zhu et al. | 709/227 |
| 2002/0130904 A1 * | 9/2002 | Becker et al. | 345/753 |
| 2003/0040340 A1 | 2/2003 | Smethers | 455/566 |
| 2004/0260753 A1 * | 12/2004 | Regan | 709/200 |
| 2005/0086309 A1 * | 4/2005 | Galli et al. | 709/206 |
| 2005/0172001 A1 * | 8/2005 | Zaner et al. | 709/205 |
| 2005/0267975 A1 * | 12/2005 | Qureshi et al. | 709/229 |
| 2006/0010197 A1 * | 1/2006 | Ovenden | 709/204 |
| 2006/0010200 A1 * | 1/2006 | Mousseau et al. | 709/204 |
| 2006/0095514 A1 * | 5/2006 | Wang et al. | 709/204 |

\* cited by examiner

*Primary Examiner* — Charles Appiah
*Assistant Examiner* — Mazda Sabouri
(74) *Attorney, Agent, or Firm* — Harrington & Smith

(57) ABSTRACT

In one aspect thereof the exemplary embodiments of this invention provide a user interface for a communication terminal. The user interface provides at least one of a first view and a second view that provide a user with a visual representation of, at least, a type of at least one ongoing communication, participants in the at least one ongoing communication, and whether content is being shared with participants of the at least one ongoing communication.

46 Claims, 18 Drawing Sheets

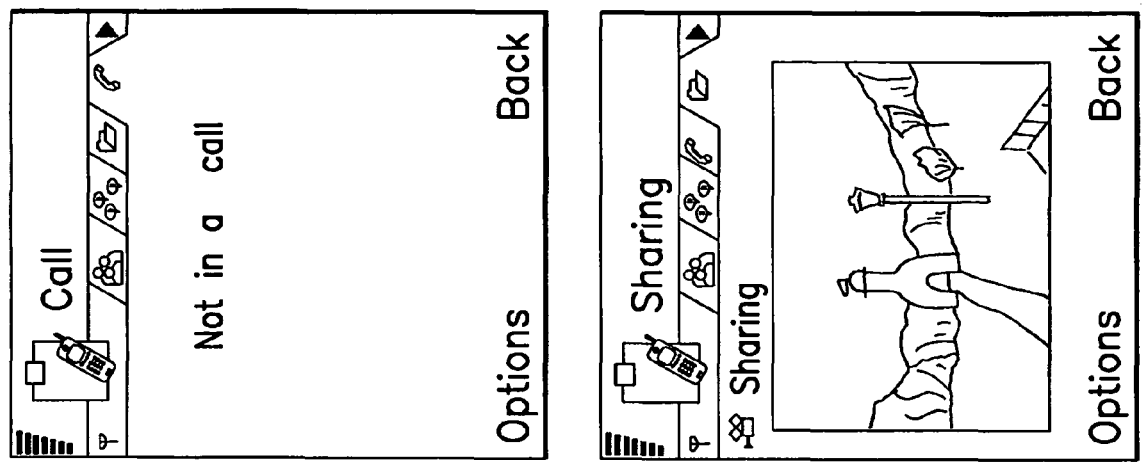
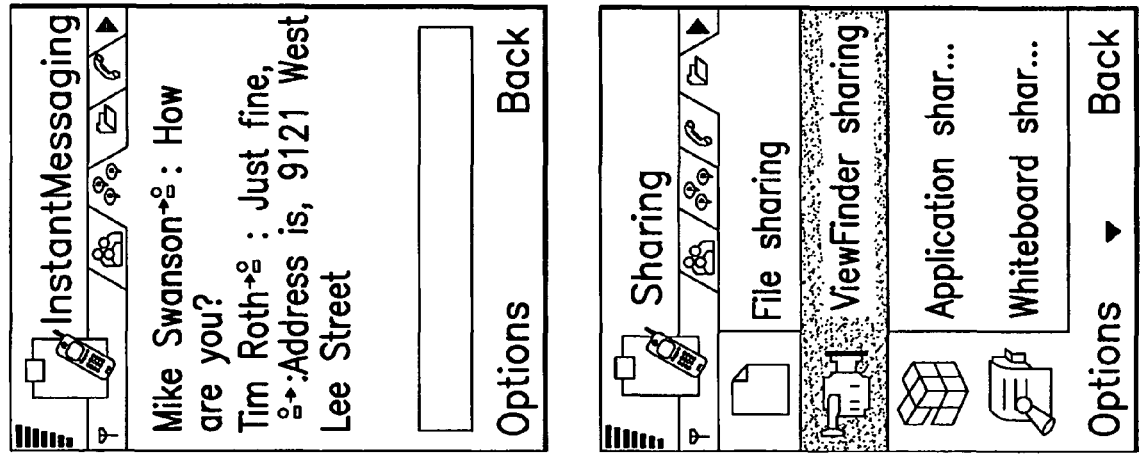
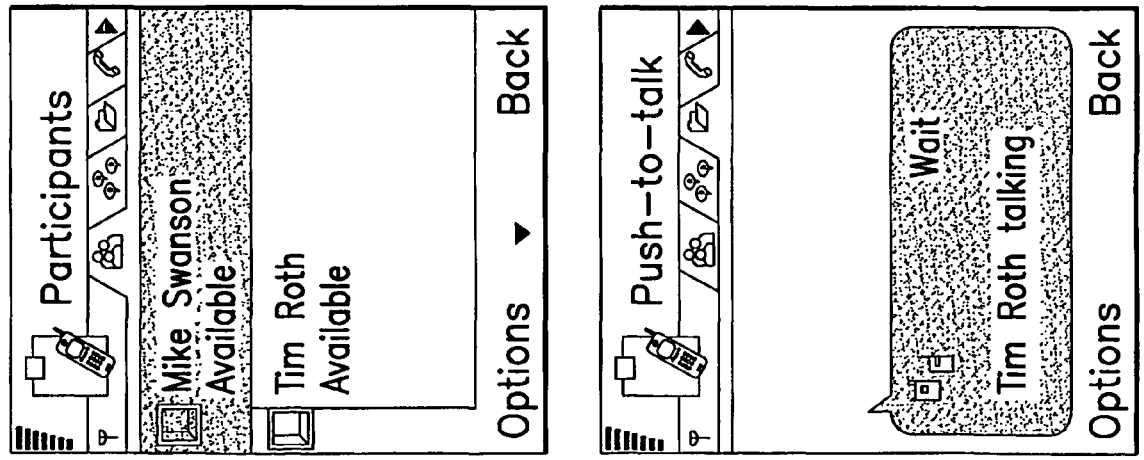
FIG. 1

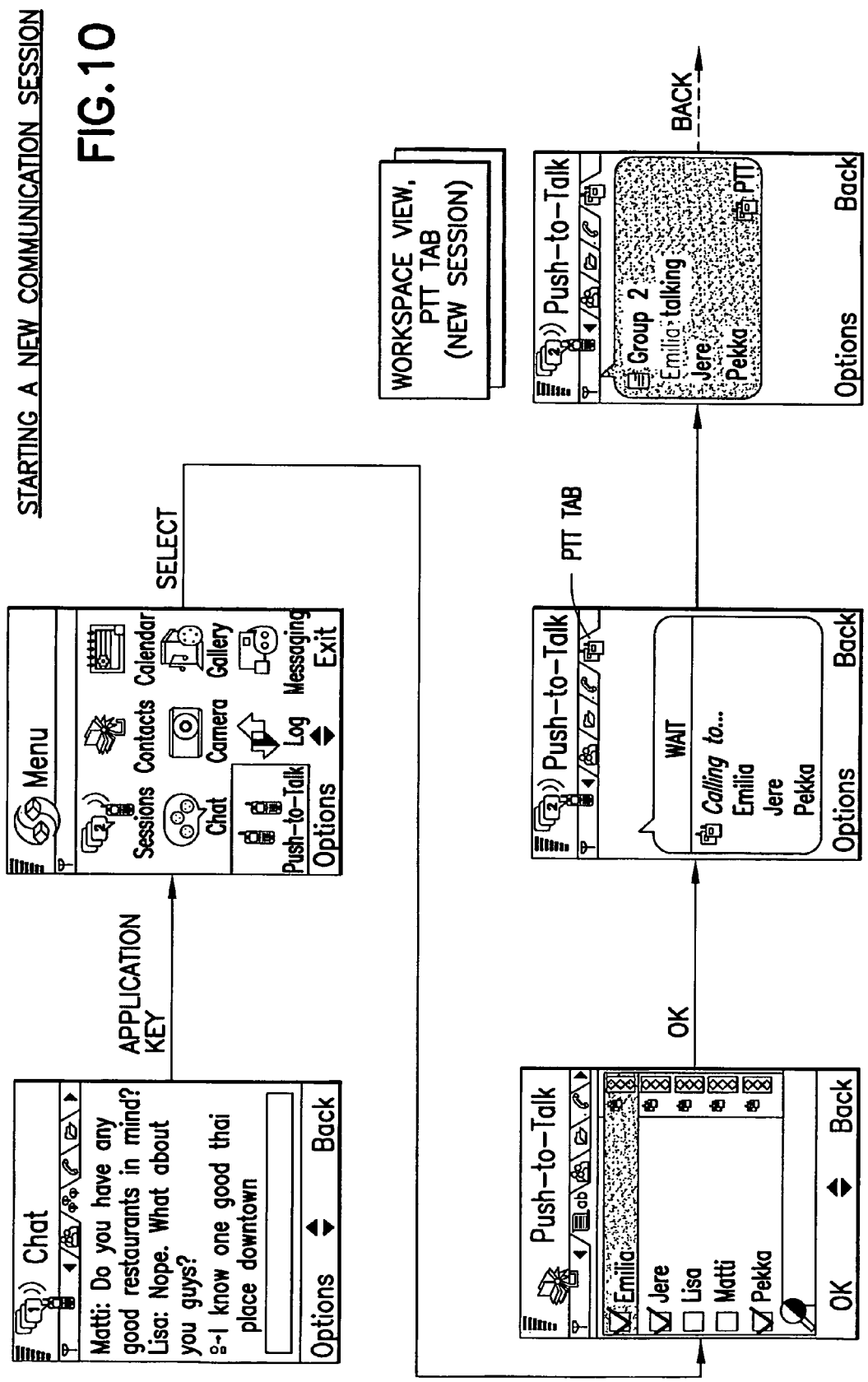
FIG.10 STARTING A NEW COMMUNICATION SESSION

| FIG. 11A | FIG. 11B |

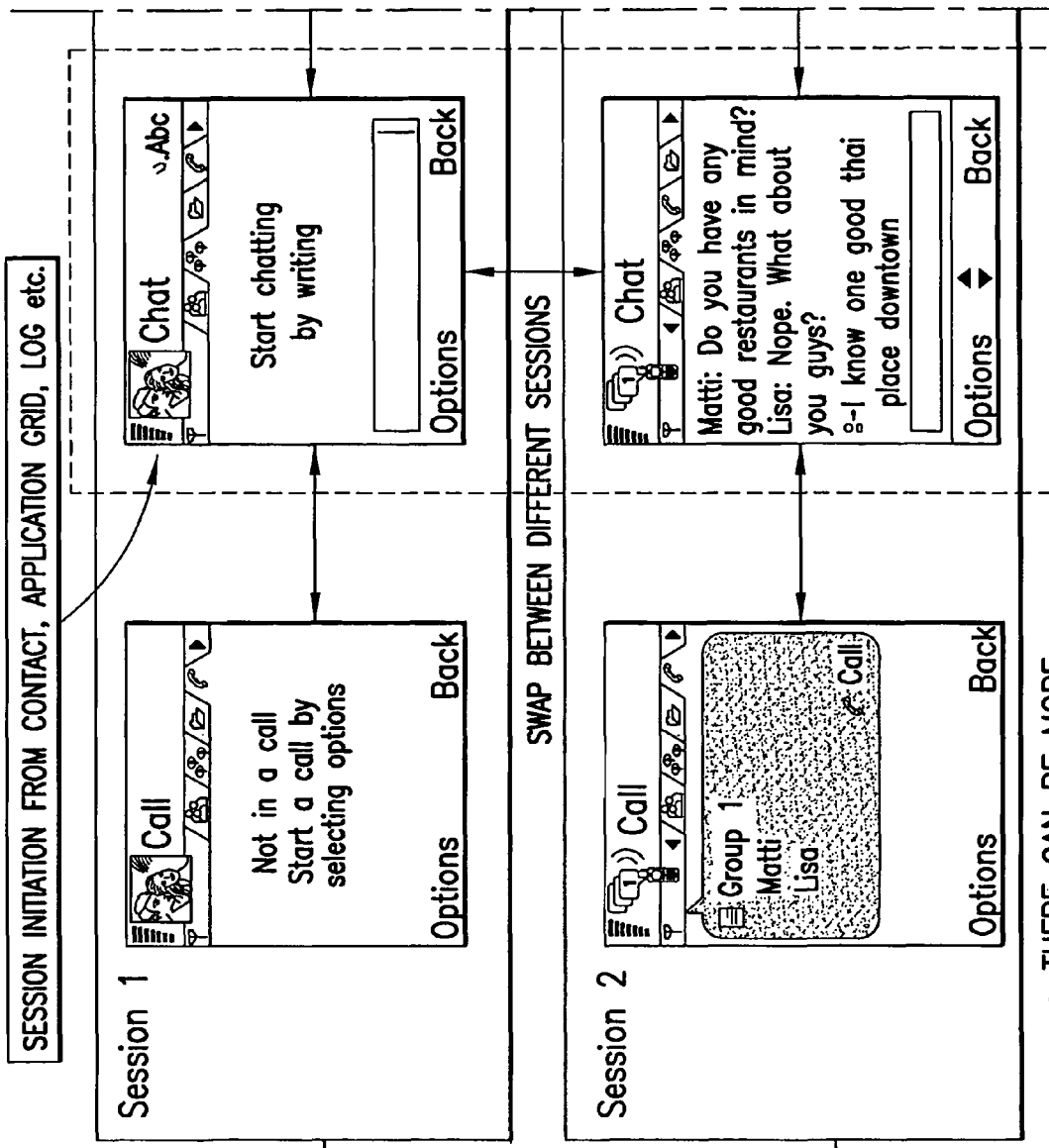

METHOD, APPARATUS AND COMPUTER PROGRAM PRODUCT PROVIDING GRAPHICAL USER INTERFACE THAT FACILITATES MANAGEMENT OF MULTIPLE SIMULTANEOUS COMMUNICATION SESSIONS

CLAIM OF PRIORITY FROM COPENDING PROVISIONAL PATENT APPLICATION

This patent application claims priority under 35 U.S.C. §119(e) from Provisional Patent Application No.: 60/629,875, filed Nov. 19, 2004, the disclosure of which is incorporated by reference herein in its entirety.

TECHNICAL FIELD

The exemplary embodiments of this invention relate generally to user interface (UI) technology and, more specifically, relate to graphical user interface (GUI) apparatus, methods and software for use in and with communication terminals.

BACKGROUND

In conventional communication terminals, such as mobile phones, there is no single UI location that can show at a glance all active ongoing communications. While individual applications may show their individual status, e.g., active instant messaging (IM) conversations in an IM application, there is no coherent view presented to the user of all active communication sessions. Additionally, in conventional practice any switching between communication sessions is accomplished via individual applications.

As a result of these shortcomings, the management of multiple simultaneous communication sessions is difficult for the user to handle because the communication management is fragmented. In addition, changing a mode within a session is not possible with the current controls. Further, as new communication modes and technologies evolve they can be expected to support multiple simultaneous communication sessions. These communication sessions can by their very nature, however, be quite different, e.g. long term, tranquil with minimal user activity frequency, or short term with more frequent interaction from the user required. The different natures of the underlying possible communications only serves to compound the problem of managing multiple simultaneous communications.

SUMMARY OF THE INVENTION

The foregoing and other problems are overcome, and other advantages are realized, in accordance with exemplary embodiments of this invention.

In one aspect thereof the exemplary embodiments of this invention provide a user interface for a communication terminal, comprising at least one of a first view and a second view that provide a user with a visual representation of, at least, a type of at least one ongoing communication, participants in the at least one ongoing communication, and whether content is being shared with participants of the at least one ongoing communication.

In another aspect thereof the exemplary embodiments of this invention provide a device that includes a data processor coupled to a user interface and operable to establish at least one of a Workspace and a Sessions view that provide a user with a visual representation of, at least, a type of at least one ongoing communication, participants in the at least one ongoing communication, and whether content is being shared with participants of the at least one ongoing communication.

In another aspect thereof the exemplary embodiments of this invention provide a computer program product embodied in a computer readable medium and comprising program instructions executable by a data processor. The program instructions are operable to cause the data processor to manage a user interface function and to establish at least one of a Workspace view and a Sessions view that provide a visual representation of, at least, a type of at least one ongoing communication, participants in the at least one ongoing communication, and whether content is being shared with participants of the at least one ongoing communication.

In another aspect thereof the exemplary embodiments of this invention provide a terminal having a processor means coupled to user interface means and operable to provide a user with a visual representation of, at least, a type of at least one ongoing communication, participants in the at least one ongoing communication, and whether content is being shared with participants of the at least one ongoing communication.

The exemplary embodiments of this invention further provide a method operable with a user interface function that includes establishing at least one of a first view and a second view to provide a visual representation of, at least, a type of at least one ongoing communication, participants in the at least one ongoing communication, and whether content is being shared with participants of the at least one ongoing communication; displaying at least one of the first view and the second view to a user of a communication device and responding to user activation of at least one control to manage operation of at least one ongoing communication.

BRIEF DESCRIPTION OF THE DRAWINGS

The foregoing and other aspects of the exemplary embodiments of this invention are made more evident in the following Detailed Description of the Invention, when read in conjunction with the attached Drawing Figures, wherein:

FIG. 1 shows a non-limiting example of a UI Workspace View;

FIG. 10 shows an example of initiating a second group communication session during an ongoing first group communication session;

FIGS. 14A and 14B, collectively referred to as FIG. 14, show an example of display presentations that illustrate the concepts of the Workspace View, Sessions View(s) and Conversations, and how the different views are logically related to one another.

DETAILED DESCRIPTION OF THE INVENTION

By way of introduction, it can be noted that as the capabilities of mobile terminals are enhanced it will become important to add enriching elements to a communication session. However, the current separate communication applications of conventional mobile terminals do not enable fluent switching between a main communication session and an enriching element. The switching between the main communication session and the enriching element should be faster and more intuitive than conventional application switching.

In addition, there is currently no capability to add enriching elements to a communication session, even for those communication terminals that are capable of creating enrichment content (e.g. creating images) or downloading enrichment content (e.g., music files). In many cases a motivation to share content may appear during a communication, thus the means to share content fluently within the session should be easily accessed and operated by the user.

Any previous capability to add content to an IM conversation differs significantly from the teachings of this invention, as will be made apparent below, at least for the reason that it applies only to one communication mode, and also for the reason that there is no centralized location for managing the shared content.

An assumption made in the implementation of the teachings of this invention is that a user desires to have a plurality of simultaneously active/ongoing communication sessions. For example, the introduction of Instant Messaging (IM), Push over Cellular (PoC, also referred to as Push to Talk (PTT) and as Push to Talk Over Cellular), video telephony and other communication modes and methodologies increases the need to provide different communication methods with the same participant.

Figure 12:
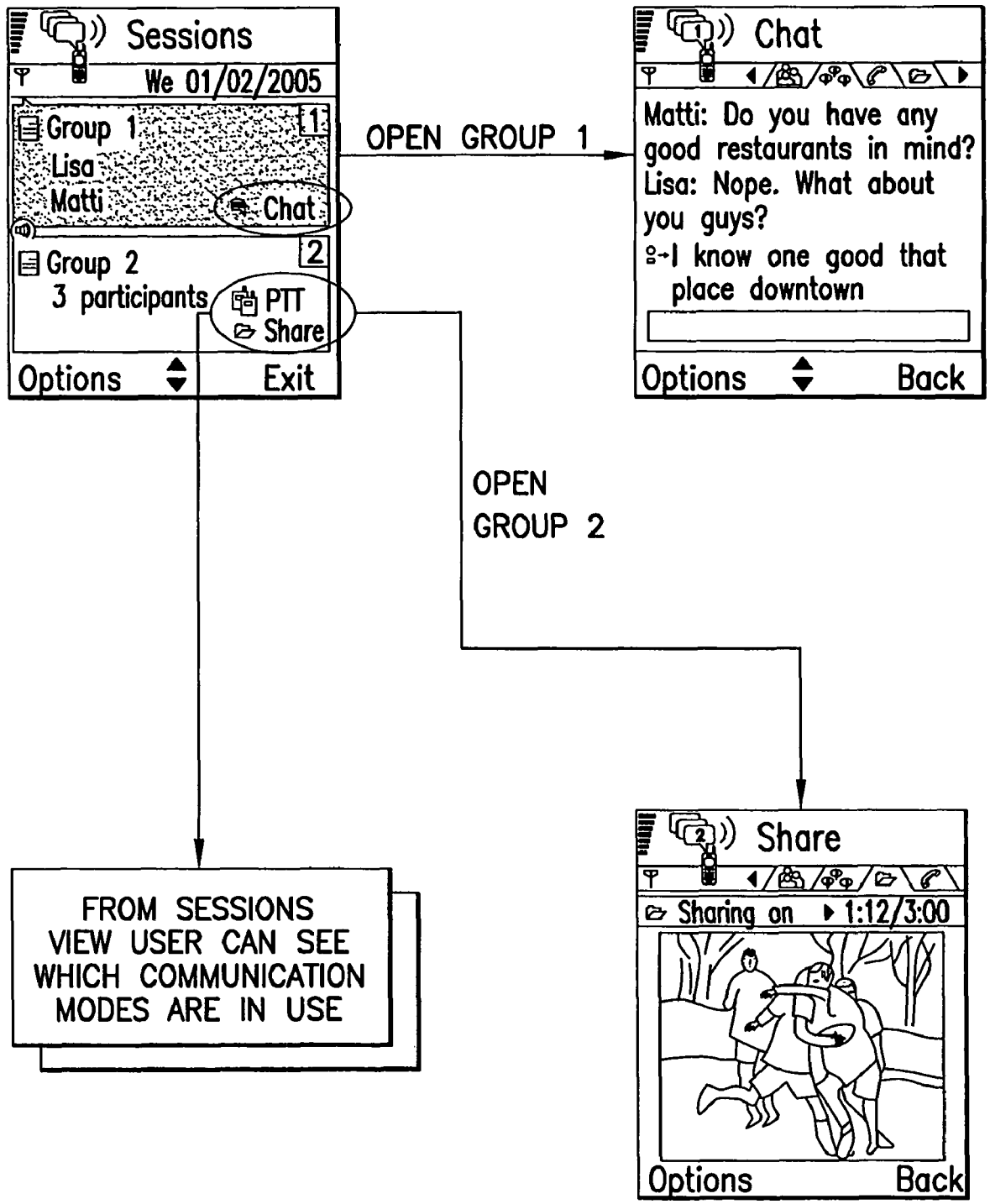
FIG. 12 shows the UI for the case where a Call of the first group communication session is terminated, leaving only a Chat session ongoing.
Figure 13:
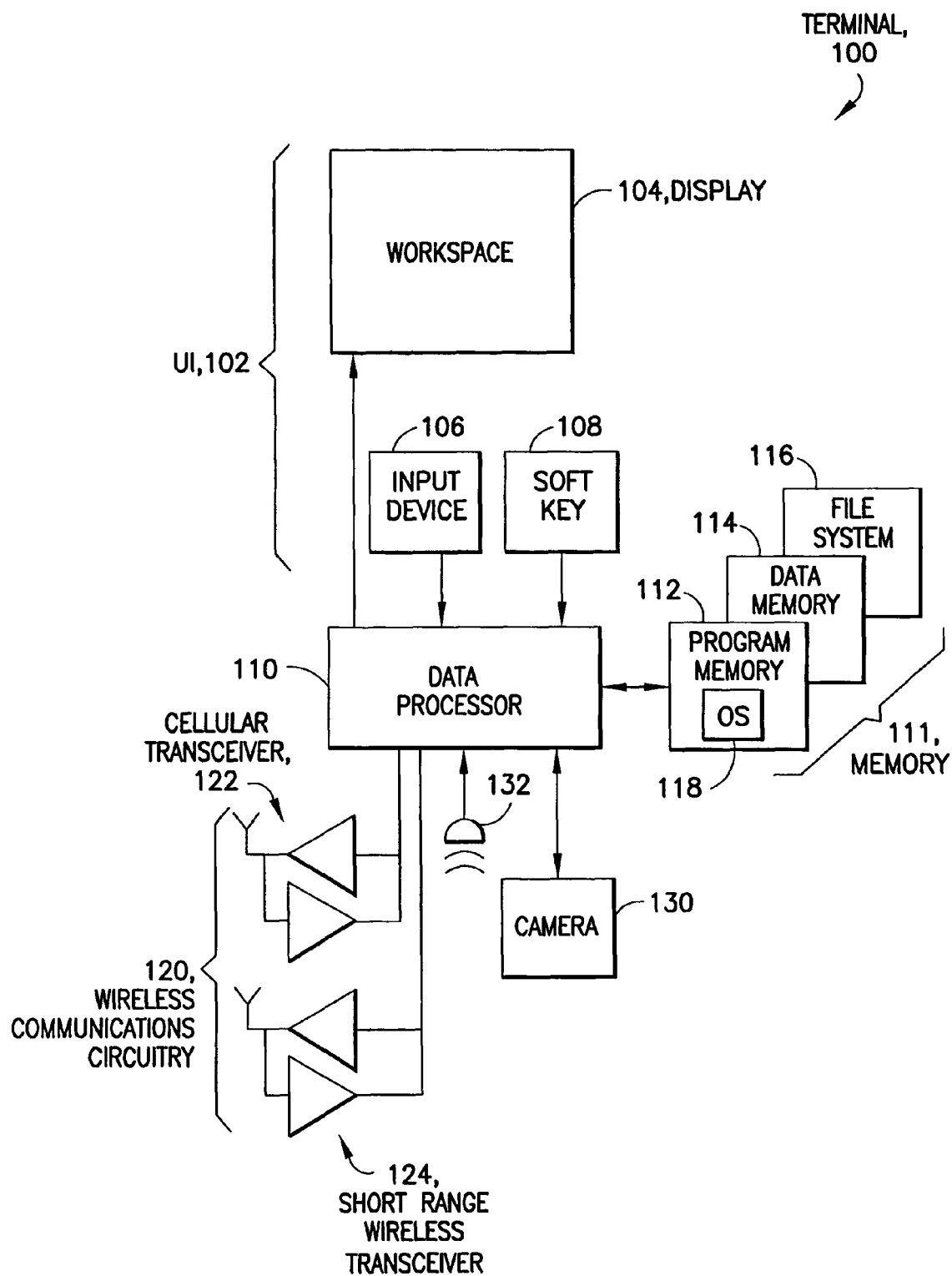
FIG. 13 is a block diagram of a terminal that includes a UI and a controller operable for implementing the exemplary embodiments of this invention.

Reference is first made to FIG. 13 for illustrating a block diagram of a terminal 100. The terminal 100 includes a UI 102 containing a display 104 and an input device 106, which can comprise a touch sensitive portion of the display 104 and/or a keypad or keyboard. If the display is touch sensitive then the keypad/keyboard may be a virtual (displayed) keypad/keyboard. Voice recognition and/or handwriting recognition may also form all or a part of the input device 106. One or more physical or virtual soft keys 108 may be provided, and may be used to implement controls for accessing and initiating the various UI functions discussed above. As non-limiting examples, the soft key(s) 108 provide a control for initiating the sharing of content with participants of an ongoing communication during the ongoing communication, a control for adding a participant to an ongoing communication during the ongoing communication, a control for initiating a new type of communication with the participants during an ongoing communication, a control for initiating a new communication with at least one other participant during an ongoing communication, and a control for switching between communications. The UI 102 is coupled to a data processor 110 that in turn is coupled to a memory 111 comprised of a program memory 112 and data memory 114. The program memory 112 stores one or more computer programs for causing the data processor 110 to implement the UI functions that are shown in FIGS. 1-12 and described above. The terminal 100 also includes wireless communications circuitry 120, such as a cellular transceiver 122 and in some embodiments also a short range RF and/or IR wireless communications transceiver 124 (e.g., a Bluetooth™ interface). If present, both the cellular transceiver 122 and the short range transceiver 124 may be simultaneously active with (as one non-limiting example) the cellular transceiver 122 being used for a telephone Call communication, via a cellular operator, and the short range transceiver 124 used for an IM Chat session communication via a wireless local area network (WLAN) interface that is coupled to the Internet and, via one or more Internet service providers, to the IM Chat participants. The terminal 100 may include a digital image capture device 130 used for generating shareable digital images and possibly videos, as described above, and for generating the shareable camera viewfinder content as well. A microphone 132 may be used to generate audio content. These various types of content, including music content, can be stored in the data memory 114, preferably in a file system 116 under control of an operating system (OS) 118, such as the Symbian™ Operating System, executed by the data processor 110. In practice, the data processor 110 may be composed of a plurality of data processors, such as a first data processor for executing the OS 118 and managing the UI 102, and a second data processor embodied as a digital signal processor (DSP) or equivalent high speed logic for managing the wireless communications circuitry 120.

It should be appreciated that the terminal 100 is exemplary of the wide range of devices in which this invention may be embodied and/or practiced.

In general, the various embodiments of the terminal 100 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by a data processor of the terminal 100, such as the processor 110, or by hardware, or by a combination of software and hardware.

The memories 112, 114 may be of any type suitable to the local technical environment and may be implemented using any suitable data storage technology, such as semiconductor-based memory devices, magnetic memory devices and systems, optical memory devices and systems, fixed memory and removable memory. The data processor 110 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts and other diagrams that are illustrative of the operation of steps and procedures of methods, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As employed herein a Workspace is considered to be a coherent UI space that provides ready access to a set of communication means, as well as to enriching means (e.g., sharing means) for a specific communication session. While communication initiation can occur from different locations (e.g., Contacts or Log in legacy terminals), after the communication is initiated the Workspace functions as the main space. With the Workspace concept other communication modes become immediately available after activation by the user.

The Workspace may contain, as one non-limiting example, various tabs, where each tab may represent a different area and mode of communication. Non-limiting examples of tabs include: Details/Participants, wherein the user can easily see the available capabilities of the network and the recipient(s); IM; PoC; Call; and Sharing. In other embodiments this could be achieved using, as another non-limiting example, a toolbar.

FIG. 1 shows a non-limiting example of the Workspace View with different tabs representing Participants, IM, Call, PTT and Sharing, where the Sharing tab enables File Sharing, communication terminal digital camera Viewfinder Sharing (shown in FIG. 1 as real-time video-sharing), Application Sharing (e.g., such as music) and Whiteboard Sharing amongst call participants. Sharing is initiated when the user is in a desired state by selecting "Share Now" on the UI of the communication terminal.

An advantage of the use of the Workspace view is that information that is conventionally distributed in separate applications in the terminal is presented visually in one single and coherent location where the user can also fluently manage enriching elements (such as Sharing). Additionally, the user can rapidly switch between different communication means and change means to communicate with the same participants.

A further non-limiting aspect of this invention is a Sessions View that gathers information of all active communication sessions, such as Call, IM, PoC, Video call and also Sharing. The Sessions View enables the user to view all of this gathered information in one single and coherent UI location. In addition to the visualization of communication sessions, the user is enabled to perform session management-related tasks such as, but not limited to, ending a communication, switching an auditive channel and adding ad-hoc participants.

Figure 14B:
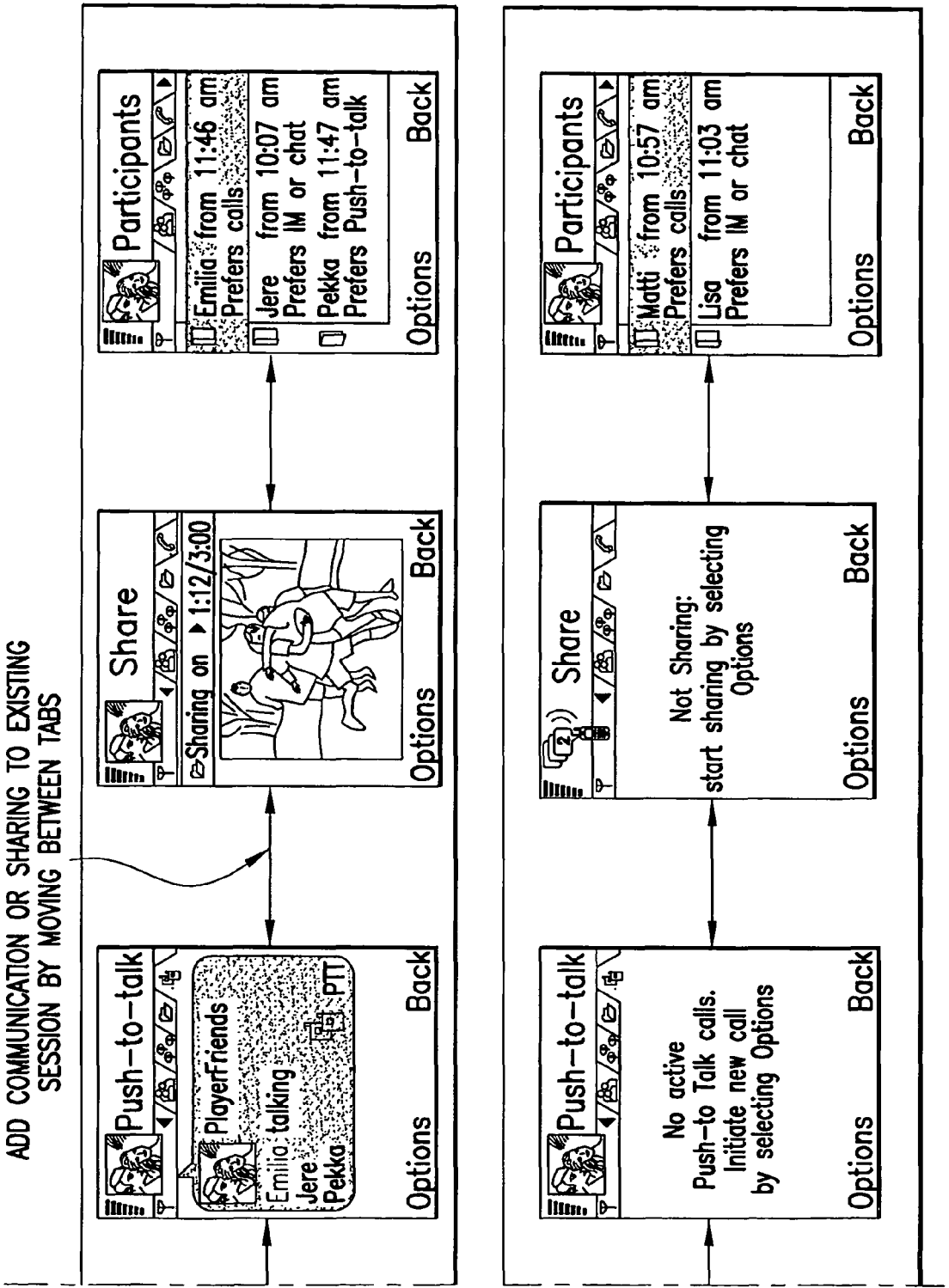

Reference can be had to FIG. 14 for representing an example of display 104 presentations that illustrate the concepts of the Workspace View, Sessions View(s) and Conversations, how the different views are logically related to one another, and how communication management functionality can be provided. It can be seen that by the user selecting the Group 1 view from a My Conversations screen with the input device 106 that a Session 1 Call screen is presented, and that by beginning to enter text in this Instant Messaging case that a chat session is initiated. Communications can be added, or sharing started, for a current session by the user moving between tabs. For example, Emilia can begin talking in a Push-to-Talk screen, and an image or video can be shared between participants as well. A Session can be initiated fro, for example, a Contacts screen, or a displayed grid of available application, or from a log, as three non-limiting examples. In addition, a user is enabled to swap between two or more on-going Sessions (e.g., between Session 1 and Session 2 in this non-limiting example).

It should be realized that the specific names for these UI spaces and views, i.e., Workspace and Sessions, are provided to be informative and generally descriptive, but are not to be read or construed in a limiting manner upon the practice and implementation of this invention. For example, these UI views could be referred to by different names, or simply as a "first view" and a "second view", or as "View A" and "View B", as non-limiting examples.

Figure 2:
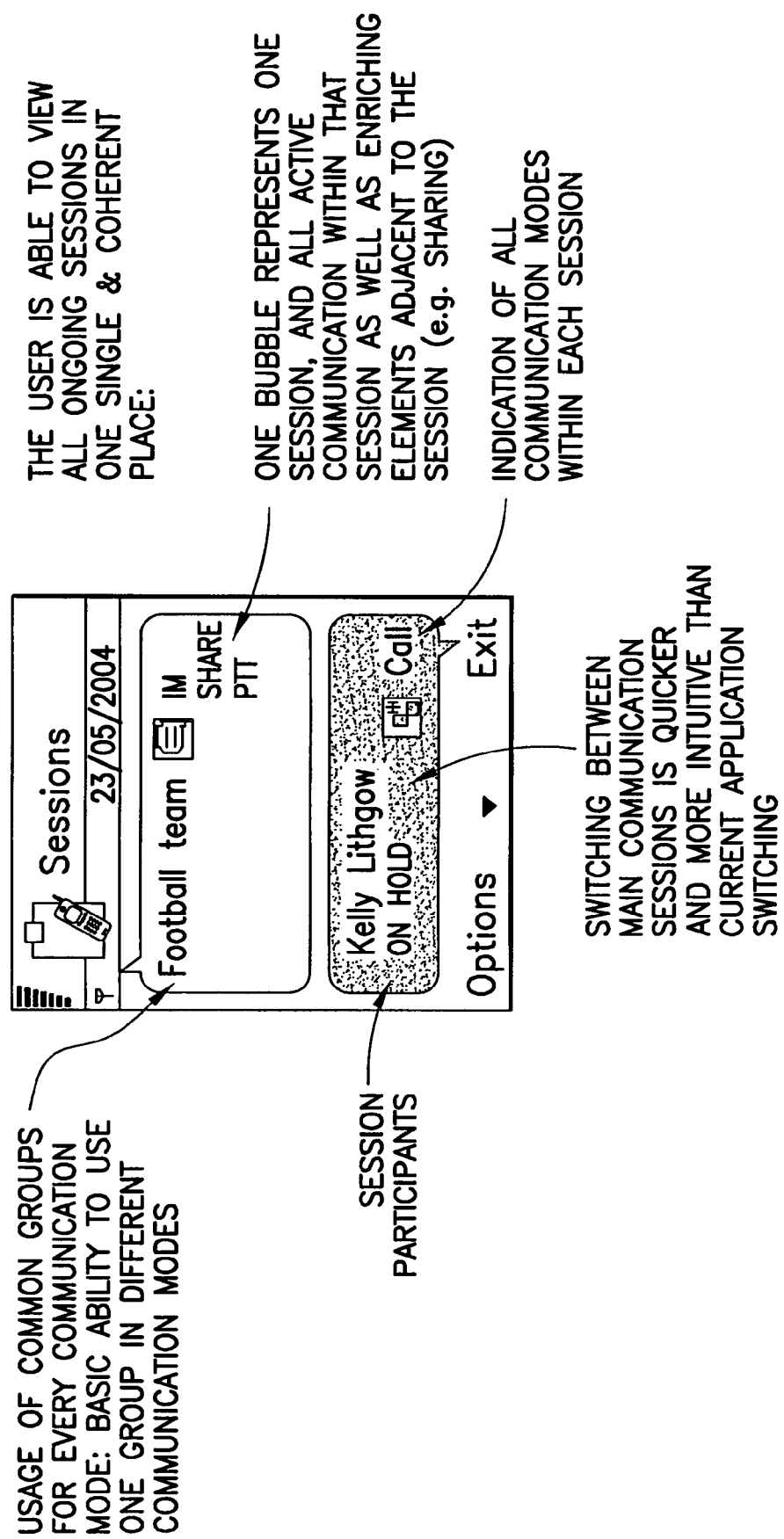
FIG. 2 shows a non-limiting example of a UI Sessions View.

Referring to FIG. 2, one list item, shown by convenience and not by way of limitation as a "bubble", represents one session. The bubble may be considered as a delineated region of the display 104 that is defined for presenting information pertaining to one particular communication session, and is not limited to any particular shape, color and/or other presentation attribute(s). All sessions may be considered to be equal in importance. Session participants (groups or individuals), as well as an indication of communication modes, can be shown in the bubble associated with each session. If a particular group does not have a saved name (e.g., an ad-hoc group), then phone numbers/names, a group name (e.g., Football Team), or at least a subset of the participants can be shown in the bubble for that session. A UI focus indicates a selected bubble, such as by color, or by de-emphasizing the intensity of non-selected bubbles. The user may scroll between the bubbles. If an event occurs within a session, e.g., the user receives a new IM, the event is indicated within the affected bubble, but preferably the (spatial) order of the bubbles does not change.

When a particular session is focused, that is, when a particular bubble is selected, the user can, for example, activate (e.g., if call is on hold), open the bubble to see additional details, or the user may end the communication.

In other embodiments the functionality of the bubble could be achieved using, as another non-limiting example, a toolbar.

The above-mentioned sharing functionality is now described in further detail.

This sharing-related aspect of the invention provides a UI implementation for enabling a centralized, rapid and user-friendly way of sharing within a communication session user-generated and other content residing in the communication terminal 100, or content that is otherwise shareable by the user (e.g., content that is located in another device but which the user has the capability to control, at least for sharing purposes.)

In the exemplary embodiments of this invention each session has its own centralized, dedicated forum for sharing so that the user can keep track of what the user is sharing and with whom. This task-supported forum for sharing any type of communication also enables variety in the usage of sharing content.

Figure 3:
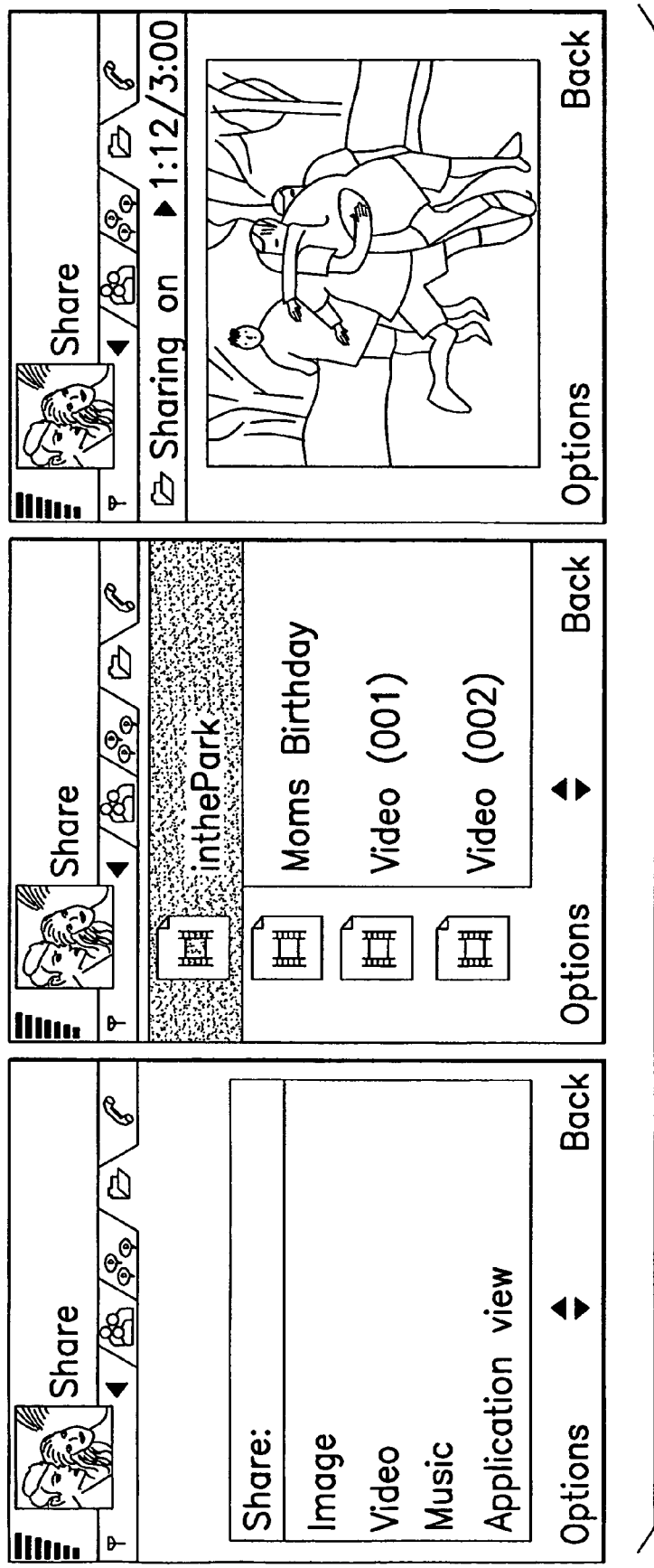
FIG. 3 shows a representation of a Centralized Forum for sharing content.

FIG. 3 shows a representation of the centralized forum for sharing that forms a part of a rich call convergence UI/Workspace. The centralized forum enables the sharing of, for example, pictures, videos, music and other audio files, camera viewfinder, application, and whiteboard. The communication sessions during which sharing becomes possible may include, as non-limiting examples, Call, PoC, and IM. Note that Sharing can also exist on its own. In the example of FIG. 3 the user selects to share a video taken in the park, and when turned on the video clip is transmitted to and can be viewed by other session participants (e.g., Call or PoC session participants). Note that this sharing can occur by streaming from the terminal 100 (where file control and ownership is held by the sender) or by sending a file.

One advantage of the use of this aspect of the invention is that it clearly benefits the end user, since a desire to share content typically occurs during a communication. Therefore, the user is provided with a technique to begin the sharing of content without disturbing the main task: e.g., textual or spoken communication. A solution in accordance with the exemplary embodiments of this invention offers a fluent technique to control sharing via the centralized sharing forum in parallel with an ongoing online communication, and thus enable unified collaboration between communication participants. The controls of both the main task (communication) and the subtask (sharing) are immediately available.

Figure 4A:
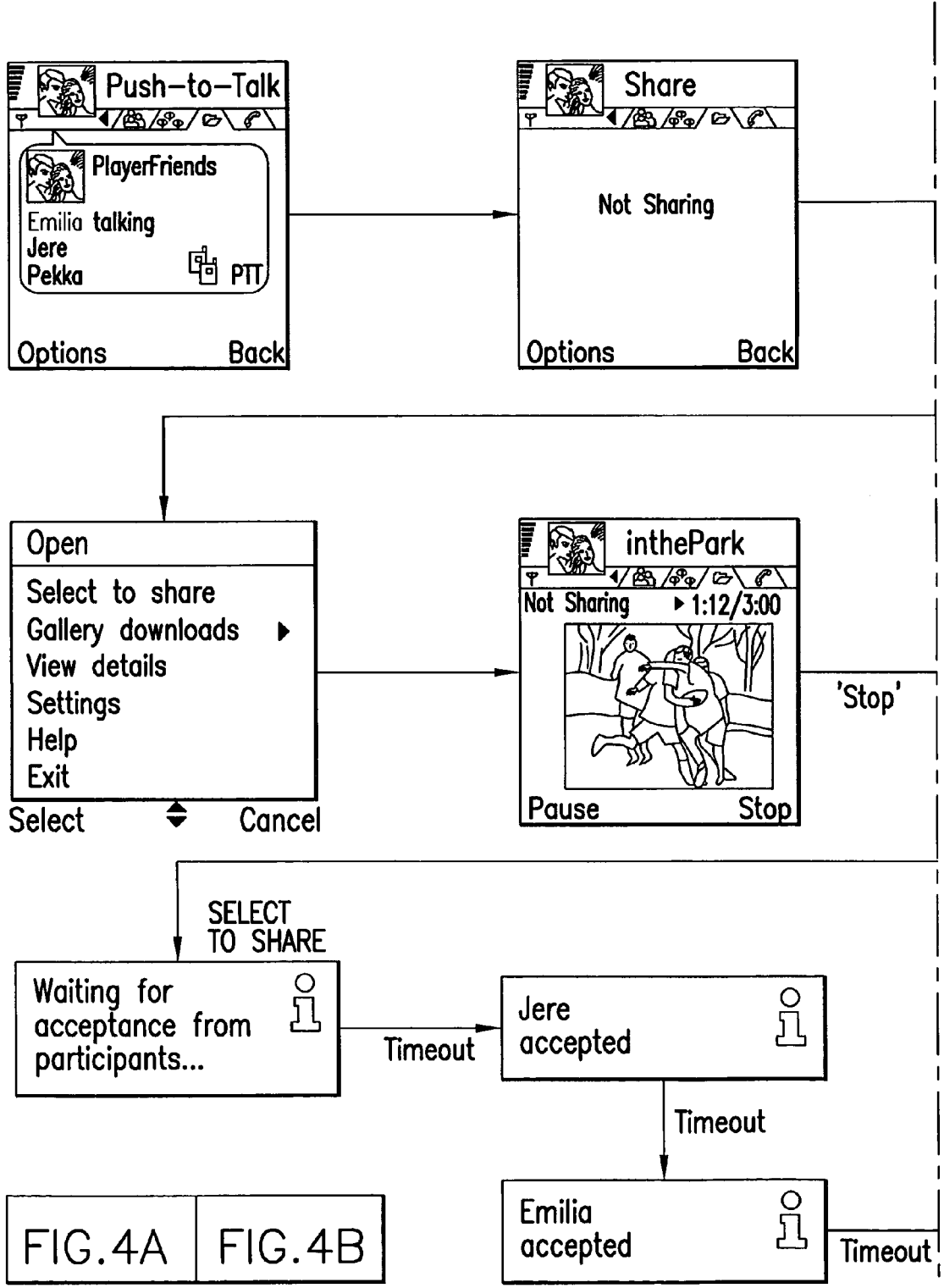
FIGS. 4A and 4B, collectively referred to as FIG. 4, show a process for a user, during a PoC communication with several participants, to select content (a video) for sharing with the participants.
Figure 4B:
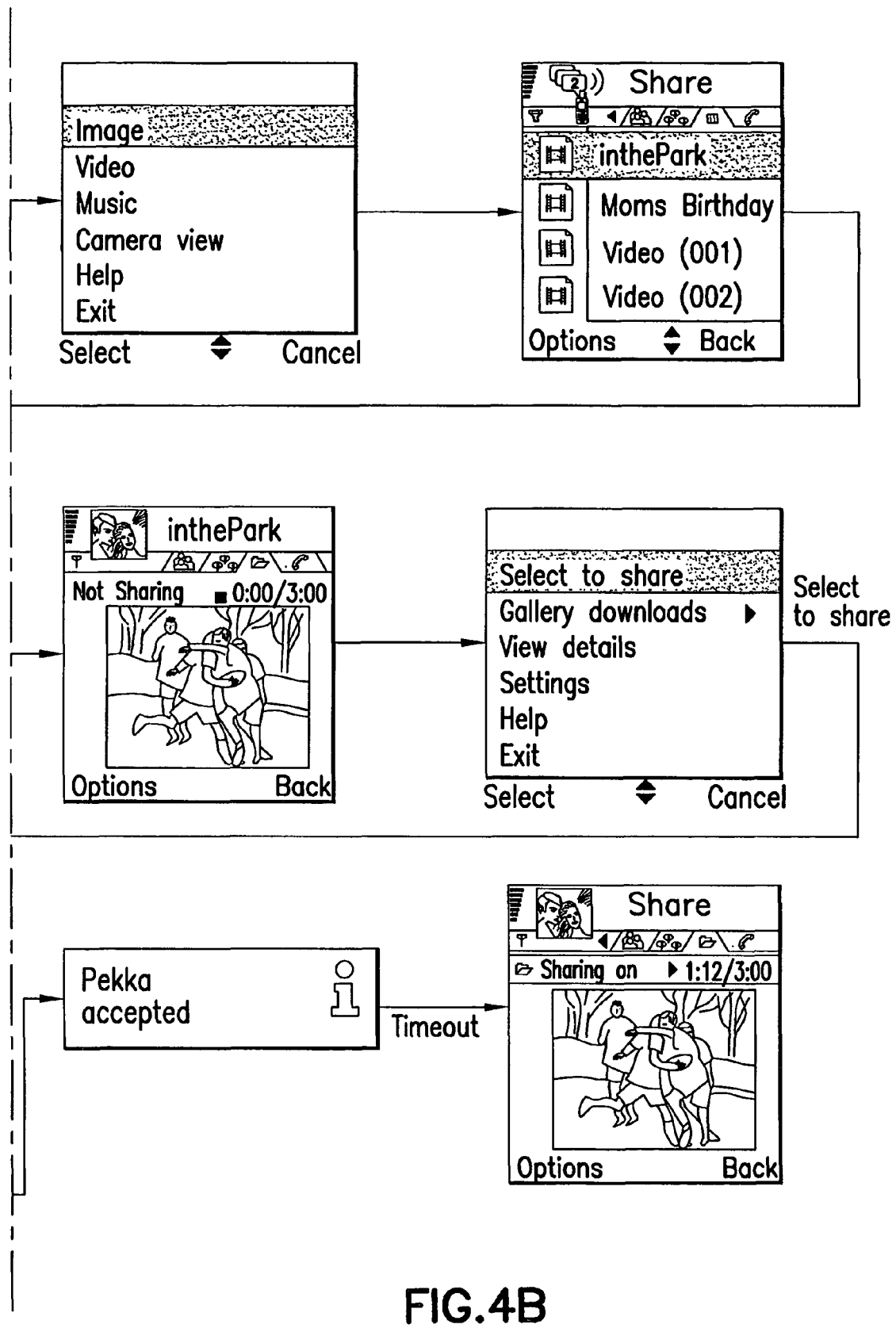

FIG. 4 shows a process for a user, during an exemplary PoC communication with participants Emilia, Jere and Pekka, to employ the UI 102 select a video (In the Park) that is stored in the terminal 100, to open the video, stop at a particular point, select to share the video, wait for the terminals of the participants to accept the shared content, and to then begin sharing (Sharing On).

Figure 5A:
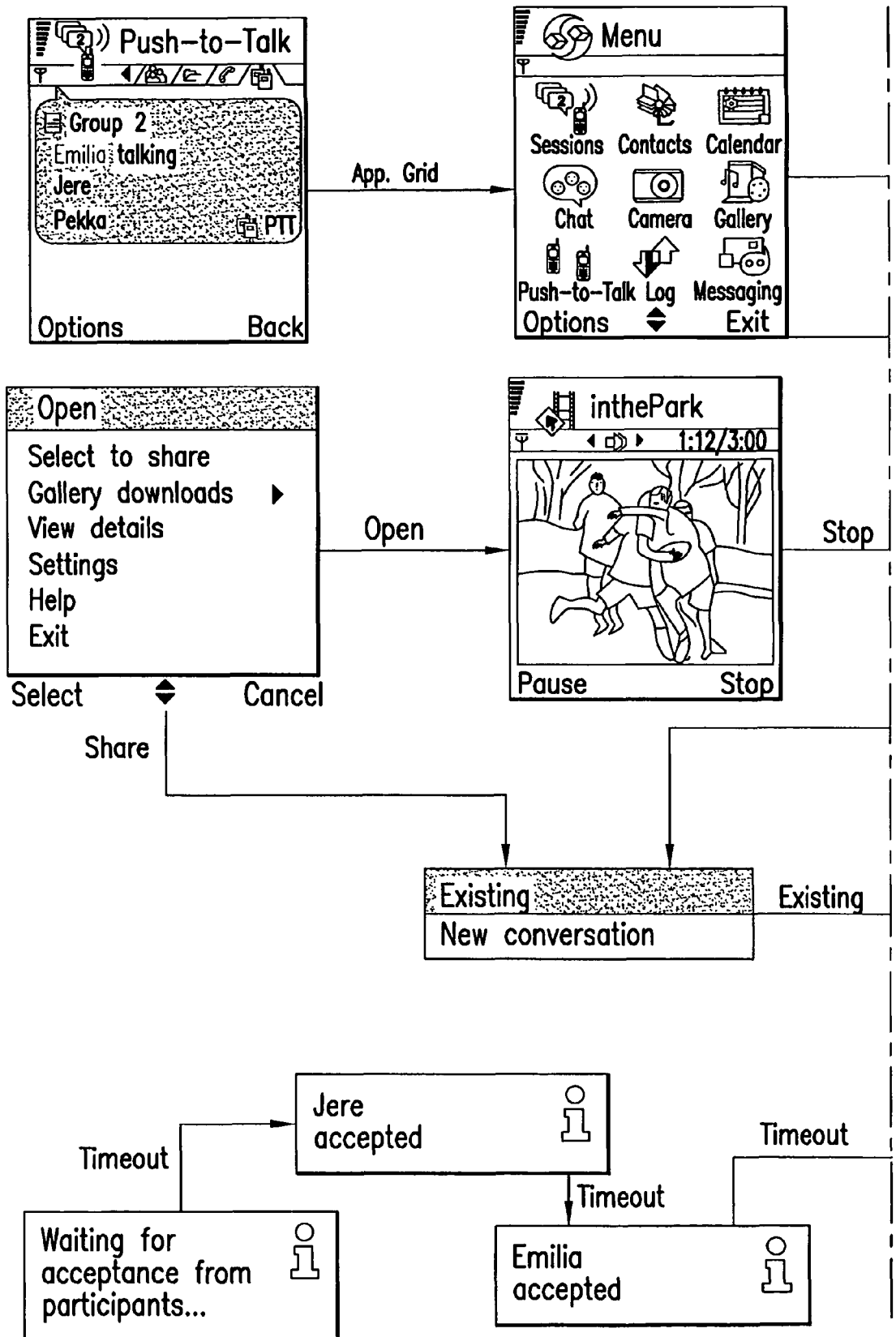
FIGS. 5A and 5B, collectively referred to as FIG. 5, show an alternative process for a user, during a PoC communication with several participants, to select the video content for sharing with the participants.
Figures 5, 5B:
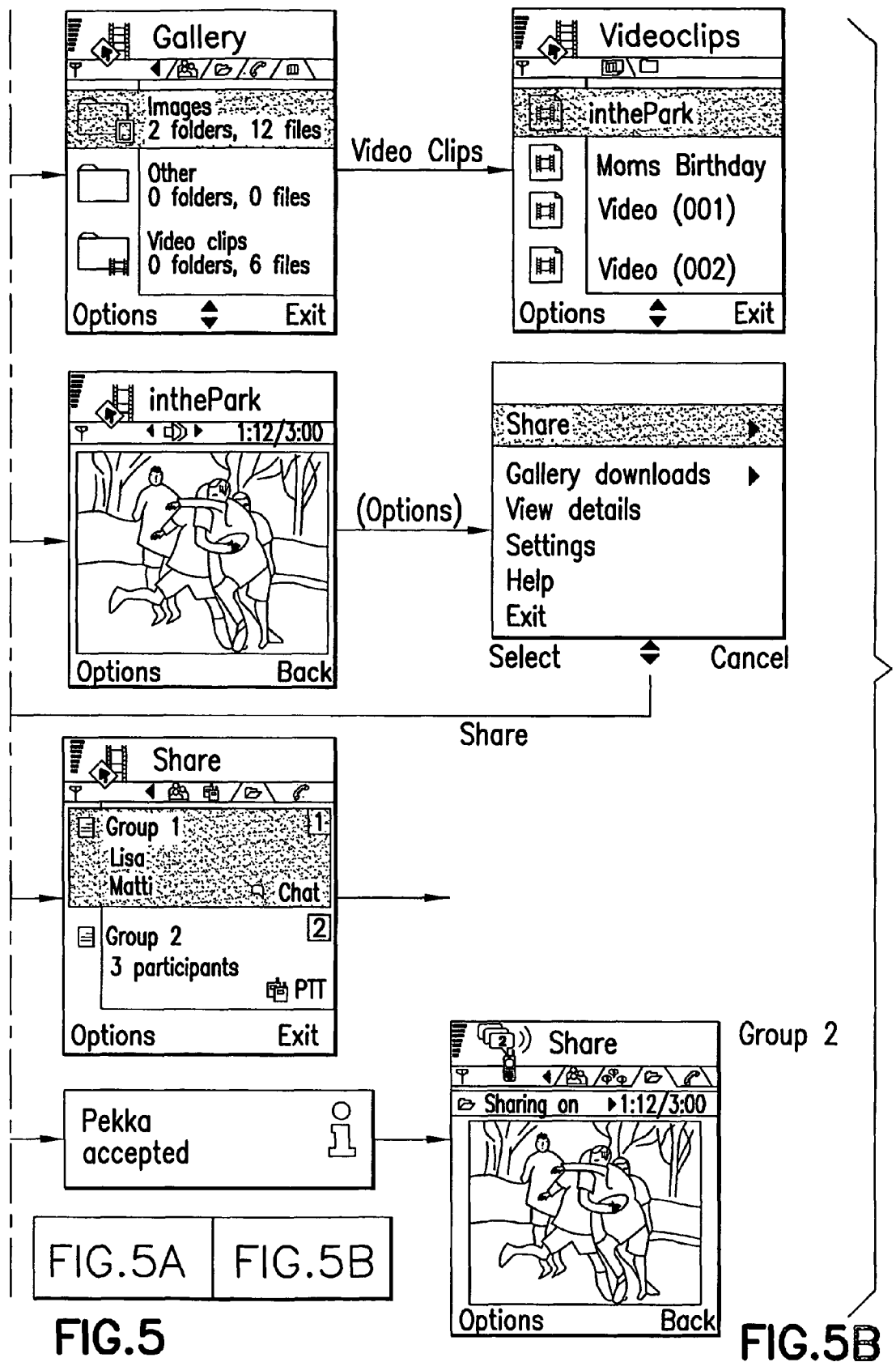

FIG. 5 shows an alternative process that uses an application grid to select a Gallery application, then a Video Clips file containing the video (In the Park), and to select the video for sharing with the Existing conversation of Group 2 (e.g., the exemplary PoC conversation).

In the exemplary embodiments of this invention the sharing options include, but need not be limited to, image sharing, camera view sharing, video sharing, music sharing, application sharing and whiteboard sharing. For image/video/music sharing it may be desirable, but not mandatory, that there be a Gallery view and image selection, the opening of an image (or music file), and by pressing a UI 102 soft key 108 (Start/Cancel) the sharing begins or is terminated. For camera view sharing it may be desirable that the camera view opens and sharing then starts immediately (with video recorder controls: e.g., Stop, Record). In a first embodiment of application sharing a dialog is opened with a list of all available applications. A UI soft key 108 may be designated Options, and a joystick function may be used to select and open an application, but sharing may not begin immediately. Instead, a control is presented in the application view, e.g., "Start Sharing". In a second exemplary embodiment of application sharing, all application views are shared, not just a selected view. The dialog is opened with the list of all available applications, and the UI soft key 108 can again be designated Options. The joystick function can be used select and open an application, and in this case sharing does begin immediately. The control is again placed in the application view. For the case of whiteboard sharing it may be desirable that the whiteboard opens (embedded to the sharing tab) and sharing begins immediately.

Sharing can occur without a communication, and sharing in the application grid can be viewed as a shortcut. When the user moves from the sharing tab to another tab it may be desirable that sharing continues. The sharing may have an audio component (e.g., only an audio component as with music, or as an adjunct to another content such as video.)

Figure 6:
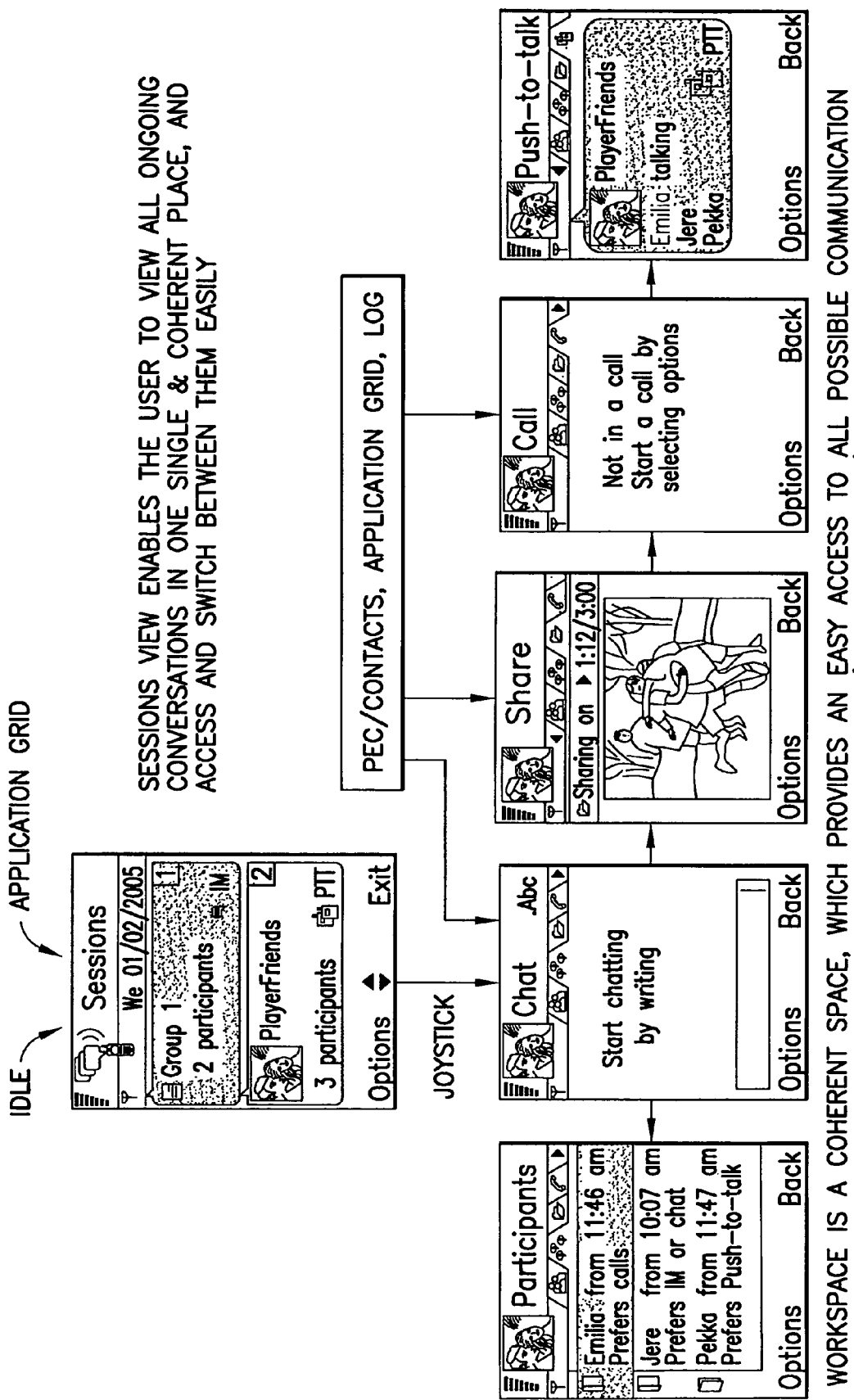
FIG. 6 shows an exemplary representation of the Workspace with Sessions View that together represent a coherent UI space to provide ready access to, and switching between, all possible communication means, as well as providing content/communication enrichment.

As was noted, the UI 102 that accommodates the handling of multiple simultaneous communications preferably provides the Sessions View, as shown in FIG. 6, that represents a coherent UI space to provide ready access to, and switching between, all possible communication means, as well as providing the content/communication enrichment means of the session bubble.

Figure 7:
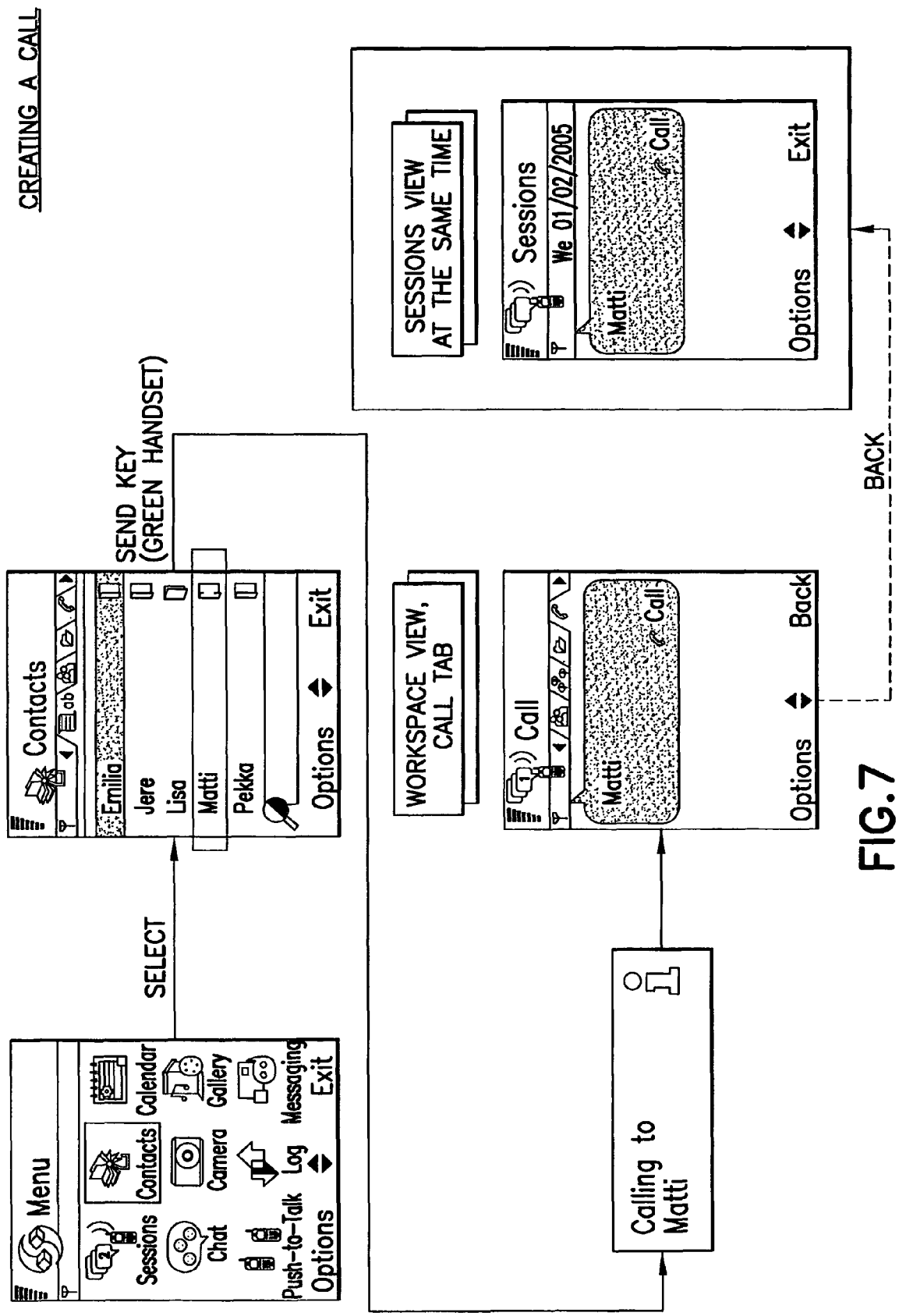
FIG. 7 shows an example of the use of the Workspace concept.

FIG. 7 shows an example of the use of the Workspace concept. Assume that the user selects Contacts from an applications Menu, then selects the individual named Matti in the list of contacts, then places a call to Matti. In the Workspace view, the Call tab shows a session bubble with a call to Matti, while the Sessions view at the same time (although possibly not simultaneously visible) shows the call to Matti.

Figure 8:
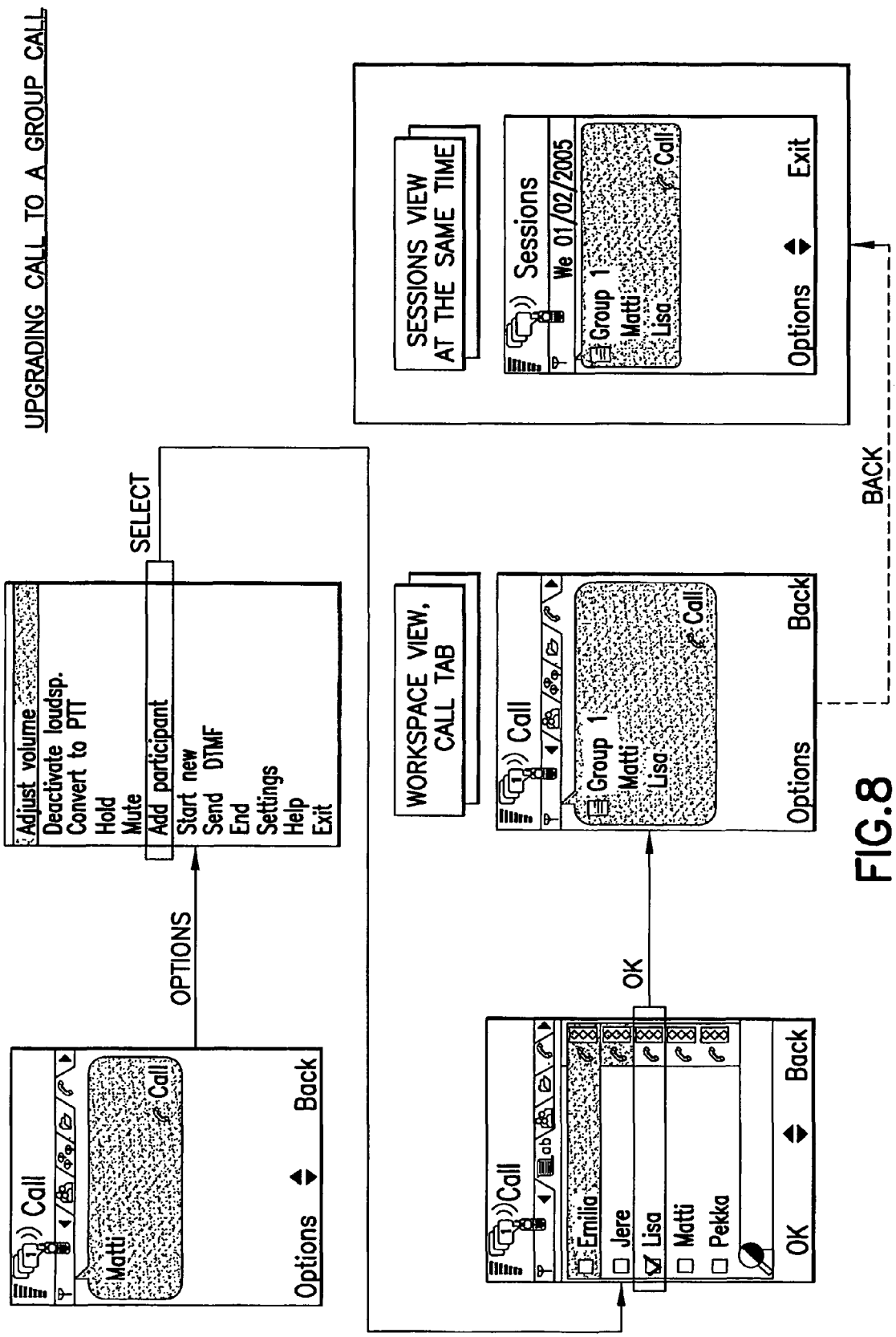
FIG. 8 shows a process of upgrading a call to an individual to a group call.

FIG. 8 shows the upgrading of the call to Matti to a group call by first selecting Options in the Call (or Sessions) view, then selecting from the list of Options 'Add Participant', which brings up a list of contacts enabling the user to select Liisa, who is called and added to a Group 1 list of participants in both the Call and Sessions views (although possibly not simultaneously visible to the user). Additionally, it shows the session to have both a Call and an IM/Chat connection.

It should be noted that the session participants information in the Workspace view is preferably updated to show information regarding Liisa as well. Additionally, the Sessions view simultaneously updates the session with Matti to be a session with Group plus a running number, indicating the number of ad-hoc connections.

In general, each time any changes occur within one session, the changes are reflected in the Workspace, and in most of the cases in the Sessions view as well (depending on the type of change). For example: when the participants of the session change (e.g., when a participant is added, or a participant is dropped) this change is reflected in the Workspace, but not necessarily in the Sessions view. This is true because if the group is a saved group then the session preferably remains under the name of the saved group, even though not all of the members may be participating. Another example is when some changes regarding communication modes occur. In this case the changes are reflected in the Workspace, and most cases in Sessions view: e.g., adding a new communication mode, dropping a communication mode, activating/deactivating Sharing, and new IM messages are indicated in the Sessions view.

With regard to the Participants tab, note that this is a state that reflects the changes that occur in communication session participants during a session. However, there is other information that this state can contain. As a few non-limiting examples, this other information can include one or more of: Application-specific Availability (this could also be presented in conjunction with different communication means); Preferred or Avoided communication means (e.g., according to presence or some profile); and Capabilities, such as the Participant's capability (terminal 100 or network related) for different forms of communication visible here.

Figure 9:
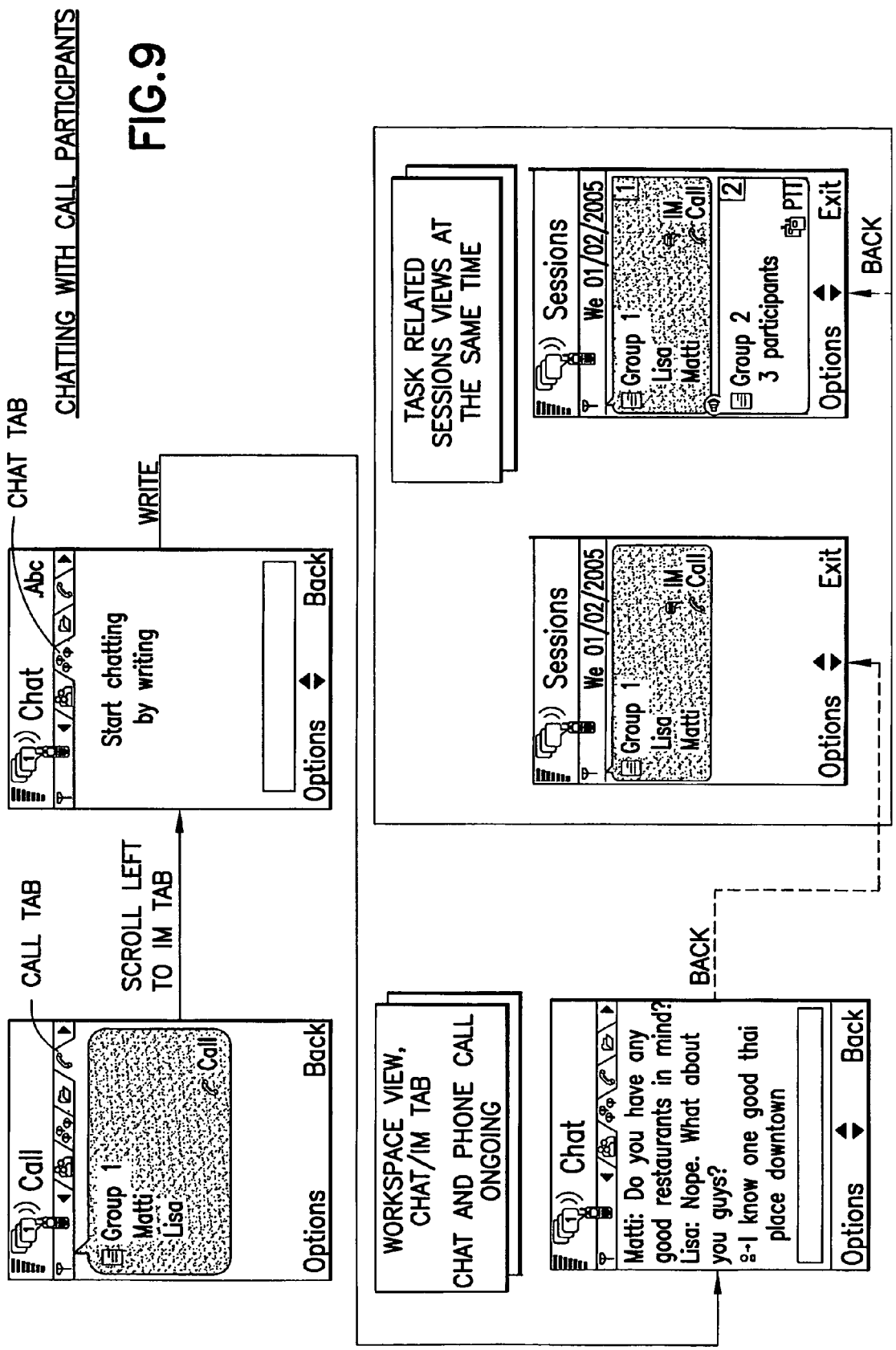
FIG. 9 shows a process of initiating a Chat/IM session with the participants of the group call of FIG. 8.

FIG. 9 shows the beginning of a Chat/IM session with the two participants of the Group 1 Call. This is accomplished by scrolling from the Call tab to the Chat tab on the UI. Chatting is start by simply entering text. The Session view then shows the session bubble for Group 1 to be a Chat/IM and Call session.

FIG. 10 shows an example of starting a new communication session by using the Push-to-Talk option to contact three new participants (for a new Group 2). The Session view then shows two communication sessions, the original IM and Call session for Group 1 and the new PTT session for Group 2.

Figure 11A:
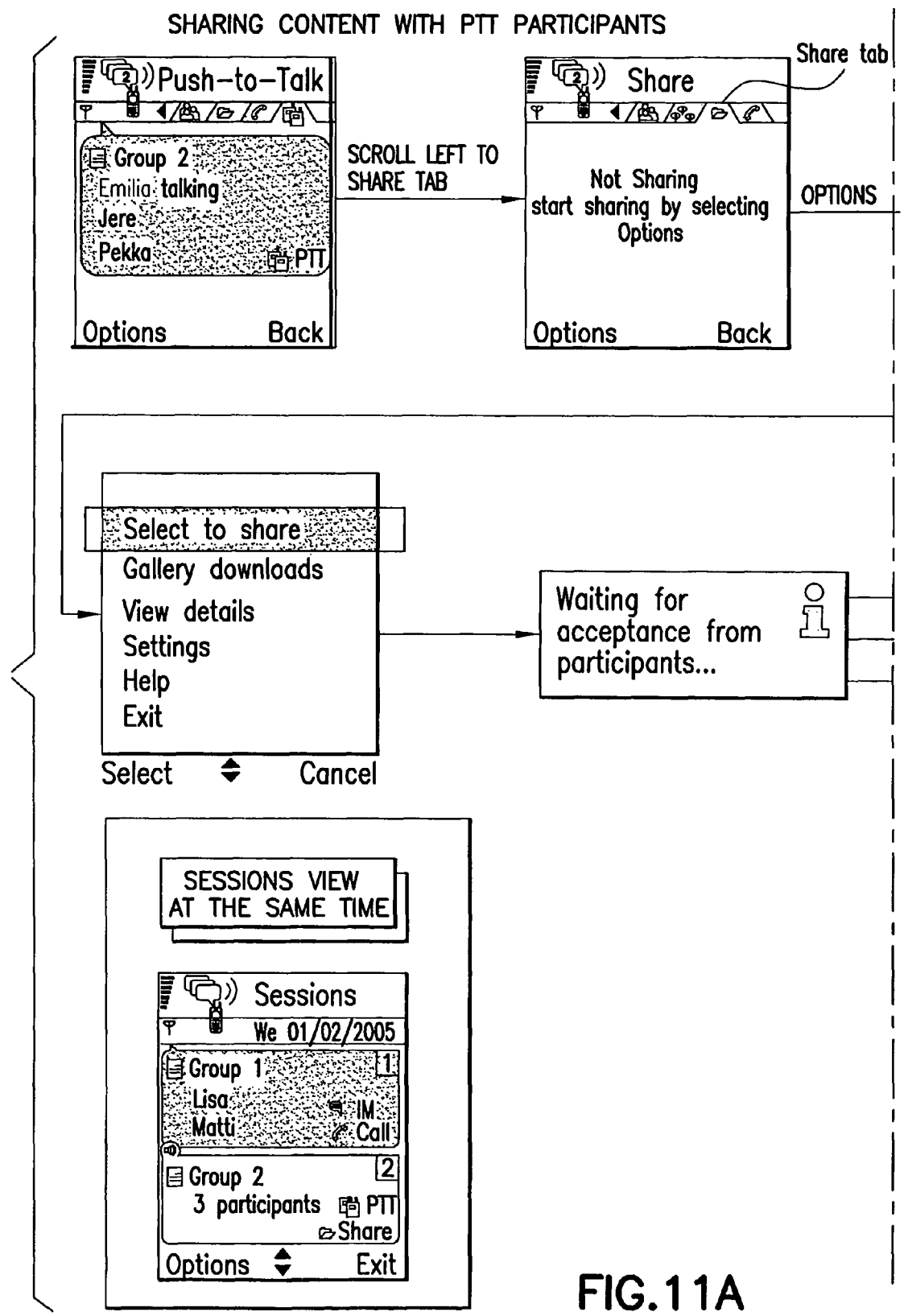
FIGS. 11A and 11B, collectively referred to as FIG. 11, illustrate a process for sharing video content with the participants of second group communication session.
Figures 11, 11B:
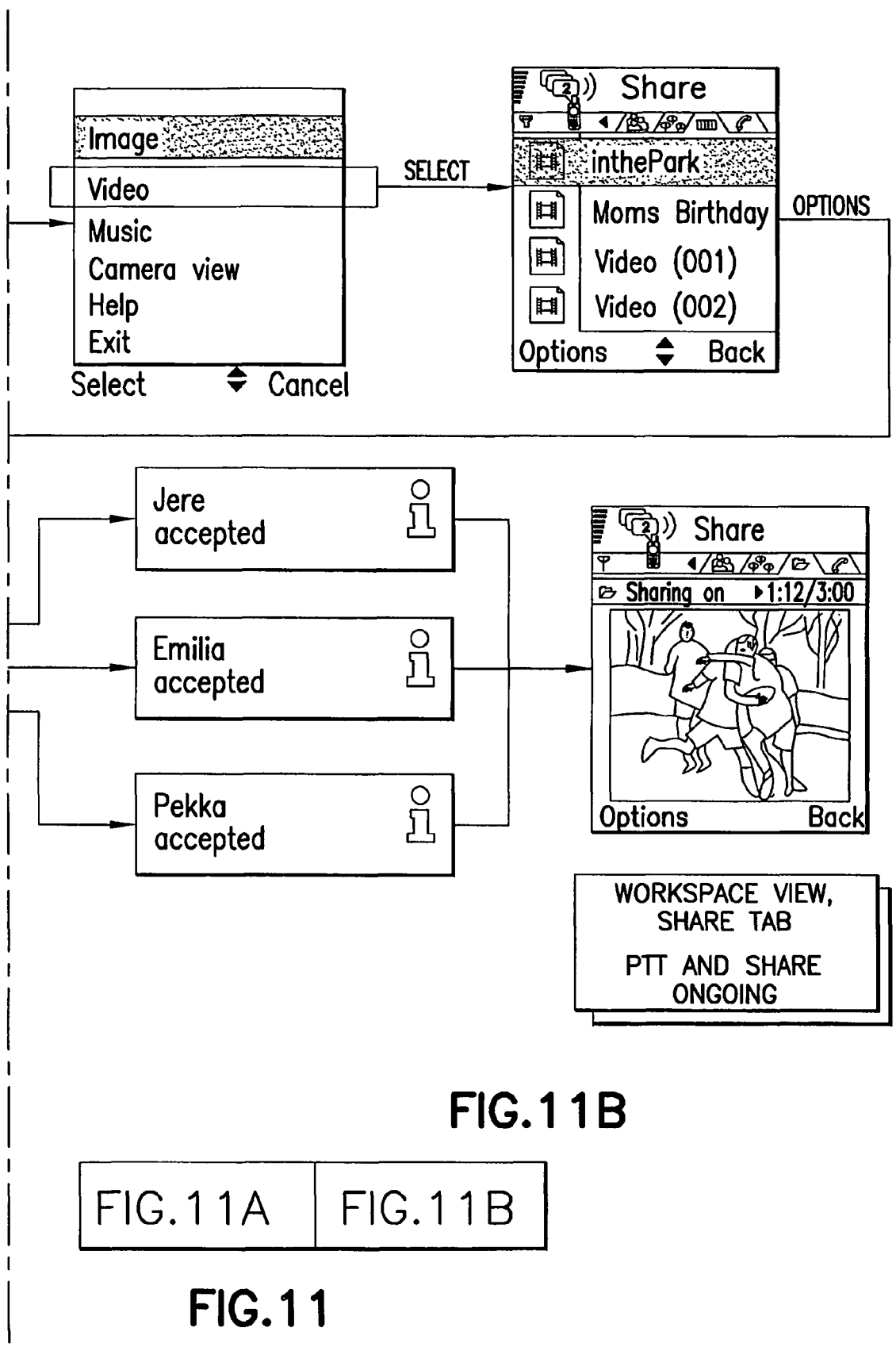

FIG. 11 shows the sharing of the above-mentioned example of the 'In the Park' video with the three PTT participants of Group 2. Sharing is initiated by scrolling from the PTT tab to the Share tab of the UI, then selecting Video from the displayed Share options, followed by Video selection, waiting for acceptance, and the start of Sharing (Sharing On). The Sessions view is then updated to show that the PTT session for Group 2 has Sharing On. Note that the acceptance notification indicators are not mandatory, and preferably the user is able to select to display them or not display them.

FIG. 12 shows the UI for the case where the Call of the first session has been terminated, leaving only the Chat session ongoing with Liisa and Matti, and the simultaneous PTT with Sharing On communication of Group 2 with three different participants.

Based on the foregoing description it should be appreciated that an aspect of this invention is an implementation of the UI 102 for adding user-enriching elements to a communication terminal 100, and that a further aspect of this invention is the UI 102 for the communication terminal 100. The UI 102 displays or otherwise manifests the Workspace View and the Sessions View that provide the user with a visual representation of, at least, types of ongoing communications, the participants in ongoing communications, and whether content is being shared with the participants of an ongoing communication.

In the exemplary embodiments of this invention, but not as a limitation upon the practice of the teachings of this invention, the communication terminal 100 is or includes a wireless communication terminal.

In the exemplary embodiments of this invention the user interface may include a control for initiating a sharing of content with participants of an ongoing communication during the ongoing communication.

In the exemplary embodiments of this invention the user interface may include a control for adding a participant to an ongoing communication during the ongoing communication.

In the exemplary embodiments of this invention the user interface may include a control for initiating a new type of communication with the participants during an ongoing communication.

In the exemplary embodiments of this invention the user interface may include a control for initiating a new communication with at least one other participant during an ongoing communication.

In the exemplary embodiments of this invention the user interface may include a control for switching between ongoing communications.

It is pointed out that the above-described Workspace view and the Session view can exist independently, that is, a Workspace view does not necessarily require a Session view, and vice versa. As a non-limiting example, a Session view can exist and present the user with information gathered from different communication applications. One bubble may represent, for example, just one communication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. As but some examples, the use of other types of communications, other types of shared content, and other formats for, and layouts of, the UI 102 may be attempted by those skilled in the art. However, all such and similar modifications of the teachings of this invention will still fall within the scope of the embodiments of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

What is claimed is:

1. A user interface for a communication terminal, comprising a session view that provides to a user a visual representation of a plurality of communication sessions on which the terminal is active,
wherein the plurality of communication sessions are provided by different communication applications, and
wherein the session view represents at least:
for each of the plurality of active communication sessions, a type of the active communication session and participants in the active communication session; and
for at least one of the active communication sessions, a status indication indicating whether or not content is being shared with corresponding participants, and
wherein the user interface is configured to
provide a user with a participant sharing option associated with content; and
wait until all of a plurality of participants in an active communication session accept the content associated with the participant sharing option before sharing the content by transmitting the content from the communication terminal to each of a plurality of participants.

2. A user interface as in claim 1, further comprising a workspace view that provides a user with a visual representation of further details of a selected one of the active communication sessions as compared to the sessions view, in which the workspace view for the selected one of the active communication sessions is displayed at the user interface in response to a user selecting any of the plurality of active communication sessions from the session view.

3. A user interface as in claim 2, the workspace view further comprising a control for initiating a sharing of content with participants of the selected active communication session during the selected active communication session.

4. A user interface as in claim 2, the workspace view further comprising a control for adding a participant to the selected active communication session during the selected active communication session.

5. A user interface as in claim 2, the workspace view further comprising a control for initiating a new active communication session with at least one other participant during the selected active communication session.

6. A device, comprising a data processor;
in which the data processor is configured to control a user interface to display a sessions view that provides to a user a visual representation of a plurality of communication sessions on which the device is active, wherein the plurality of communication sessions are provided by different communication applications, and in which for each of the plurality of active communication sessions the session view represents at least, a type of the active communication session, participants in the active communication session, and for at least one of the active communication sessions a status indication indicating whether or not content is being shared with participants of the at least one active communication session; and
wherein the data processor is configured to send a "share" message to a plurality of participants in an active communication session, and wait until all of the plurality of participants accept before sharing content by transmitting the content from the to each of a plurality of participants.

7. A device as in claim 6, in which the data processor is configured to control the user interface to further display a workspace view that provides a user with a visual representation of further details of a selected one of the active communication sessions as compared to the sessions view, in which the workspace view is displayed at the user interface in response to a user selecting any of the plurality of active communication sessions from the session view.

8. A device as in claim 7, in which the workspace view further comprises a control for initiating a sharing of content with participants of the selected active communication session during the selected active communication session.

9. A device as in claim 7, in which the workspace view further comprises a control for adding a participant to the selected active communication session during the selected active communication session.

10. A device as in claim 7, in which the workspace view further comprises a control for initiating a new active communication session with at least one other participant during the selected active communication session.

11. A computer program product embodied in a non-transitory computer readable memory medium and storing a program of computer readable instructions executable by a data processor, said instructions operable to cause said data processor to:
manage a user interface function and to establish a display of a sessions view that provides to a user a visual representation of a plurality of communication sessions on which a communication terminal is active, wherein the plurality of communication sessions are provided by different communication applications, and in which for each of the plurality of active communication sessions the session view represents, at least, a type of the active communication session, participants in the active communication session, and for at least one of the active communication sessions a status indication indicating whether or not content is being shared with participants of the at least one active communication session; and
send a "share" message to a plurality of participants in an active communication session, and wait until all of the plurality of participants accept before sharing content by transmitting the content from the communication terminal to each of a plurality of participants.

12. A computer program product as in claim 11, where said user interface function comprises a control for initiating a sharing of content with participants of the selected active communication session during the selected active communication session.

13. A computer program product as in claim 11, where said user interface function comprises establishing a display of a workspace view that provides a user with a visual representation of further details of a selected one of the active communication sessions as compared to the sessions view, in which the workspace view is displayed at the user interface in response to a user selecting any of the plurality of active communication sessions from the session view.

14. A computer program product as in claim 13, in which the workspace view further comprises a control for adding a participant to the selected active communication session during the selected active communication session.

15. A computer program product as in claim 13, in which the workspace view further comprises a control for initiating a new active communication session with at least one other participant during the selected active communication session.

16. A method comprising:
establishing at a communication terminal a session view to provide a visual representation of a plurality of communication sessions on which the communication terminal is active, wherein the plurality of communication sessions are provided by different communication applications, and in which for each of the plurality of active communication sessions the session view represents at least, a type of the active communication session, participants in the active communication session, and for at least one of the active communication sessions a status indication indicating whether or not content is being shared with participants of the at least one active communication session;
displaying the session view at a user interface of a communication device;
responding to user activation of at least one control to manage operation of at least one of the plurality of active communication sessions; and
sending a "share" message to a plurality of participants in an active communication session, and waiting until all of the plurality of participants accept before sharing content by transmitting the content from the communication terminal to each of a plurality of participants.

17. A method as in claim 16, where in response to user activation of a control, the method comprises displaying at the user interface a workspace view that provides a user with a visual representation of further details of a selected one of the active communication sessions as compared to the sessions view, in which the workspace view is displayed at the user interface in response to a user selecting any of the plurality of active communication sessions from the session view.

18. A method as in claim 17, where in response to user activation of a control while the workspace view is displayed, the method comprises initiating a sharing of content with participants of the selected active communication session during the selected active communication session.

19. A method as in claim 17, where in response to user activation of a control while the workspace view is displayed, the method comprises initiating a new active communication session with at least one other participant during the selected active communication session.

20. A user interface as in claim 2, in which the workspace view further comprises tabs which when selected switch the workspace view between the active communication sessions.

21. A user interface as in claim 20, in which there is a different tab in the workspace view corresponding to each of the plurality of active communication sessions of the session view.

22. A user interface as in claim 20, in which at least one of the tabs in the workspace view is a share tab which when selected by a user enables sharing of content between the terminal in which the user interface is disposed and at least one participant in the selected one of the active communication sessions.

23. A device as in claim 7, in which the workspace view further comprises tabs which when selected switch the workspace view between the active communication sessions.

24. A device as in claim 23, in which there is a different tab in the workspace view corresponding to each of the plurality of active communication sessions of the session view.

25. A device as in claim 23, in which at least one of the tabs in the workspace view is a share tab which when selected by a user enables sharing of content between the terminal in which the user interface is disposed and at least one participant in the selected one of the active communication sessions.

26. A computer program product as in claim 13, in which the workspace view further comprises tabs which when selected switch the workspace view between the active communication sessions.

27. A computer program product as in claim 26, in which there is a different tab in the workspace view corresponding to each of the plurality of active communication sessions of the session view.

28. A computer program product as in claim 26, in which at least one of the tabs in the workspace view is a share tab which when selected by a user enables sharing of content between the terminal in which the user interface is disposed and at least one participant in the selected one of the active communication sessions.

29. A method as in claim 17, in which the workspace view further comprises tabs which when selected switch the workspace view between the active communication sessions.

30. A method as in claim 29, in which there is a different tab in the workspace view corresponding to each of the plurality of active communication sessions of the session view.

31. A method as in claim 29, in which at least one of the tabs in the workspace view is a share tab which when selected by a user enables sharing of content between the terminal in which the user interface is disposed and at least one participant in the selected one of the active communication sessions.

32. A user interface as in claim 1, wherein the different communications applications comprise two or more of: an instant messaging application; a content sharing application; a push over cellular application; a video telephony application; and a telephony application.

33. A device as in claim 6, wherein the different communications applications comprise two or more of: an instant messaging application; a content sharing application; a push over cellular application; a video telephony application; and a telephony application.

34. A computer program product as in claim 11, wherein the different communications applications comprise two or more of: an instant messaging application; a content sharing application; a push over cellular application; a video telephony application; and a telephony application.

35. A method as in claim 16, wherein the different communications applications comprise two or more of: an instant messaging application; a content sharing application; a push over cellular application; a video telephony application; and a telephony application.

36. A device as in claim 6, wherein the data processor is configured to send said "share" message upon user selection of a participant sharing option on the user interface, and wherein said participant sharing option is associated with the content to be shared.

37. A computer program product as in claim 11, wherein said instructions are further operable to cause said data processor to send said "share" message upon user selection of a participant sharing option on the user interface, and wherein said participant sharing option is associated with the content to be shared.

38. A method as in claim 16, wherein sending said "share" message is performed upon user selection of a participant sharing option on the user interface, and wherein said participant sharing option is associated with the content to be shared.

39. A user interface as in claim 1, wherein said content is stored on said communication terminal.

40. A device as in claim 6, wherein said content is stored on said device.

41. A computer program product as in claim 11, wherein said content is stored on said communication terminal.

42. A method as in claim 16, wherein said content is stored on said communication terminal.

43. A user interface as in claim 1, wherein the user interface is configured to wait until all of three or more participants in an active communication session accept the content associated with the participant sharing option before sharing the content.

44. A user interface as in claim 1, wherein the transmission of the content is by streaming or by sending a file.

45. A device as in claim 6, wherein the device is one or more of a cellular phone, a personal digital assistant, a portable computer, an image capture device, a digital camera, a gaming device, a music storage appliance, a music playback appliance, and an internet appliance configured to enable Internet access and browsing.

46. The device of claim 6, the device further comprising: at least one memory including computer program code.

\* \* \* \* \*